United States Patent
Guim Bernat et al.

(10) Patent No.: US 12,189,512 B2
(45) Date of Patent: Jan. 7, 2025

(54) PERFORMANCE MONITORING FOR SHORT-LIVED FUNCTIONS

(71) Applicant: Intel Corporation, Santa Clara, CA (US)

(72) Inventors: Francesc Guim Bernat, Barcelona (ES); Steven Briscoe, Munich (DE); Karthik Kumar, Chandler, AZ (US); Alexander Bachmutsky, Sunnyvale, CA (US); Timothy Verrall, Pleasant Hill, CA (US)

(73) Assignee: Intel Corporation, Santa Clara, CA (US)

(*) Notice: Subject to any disclaimer, the term of this patent is extended or adjusted under 35 U.S.C. 154(b) by 1139 days.

(21) Appl. No.: 16/829,935

(22) Filed: Mar. 25, 2020

(65) Prior Publication Data
US 2020/0241999 A1 Jul. 30, 2020

(51) Int. Cl.
G06F 11/34 (2006.01)
H04L 43/08 (2022.01)

(52) U.S. Cl.
CPC ...... G06F 11/3495 (2013.01); G06F 11/3419 (2013.01); H04L 43/08 (2013.01)

(58) Field of Classification Search
CPC ........ G06F 9/50; G06F 9/5005; G06F 9/5011; G06F 9/5027; G06F 9/5077; G06F 11/30; G06F 11/3003; G06F 11/302; G06F 11/34; G06F 11/3409; G06F 11/3495; G06F 2201/865; H04L 41/5009; H04L 41/5019;

(Continued)

(56) References Cited

U.S. PATENT DOCUMENTS 10,181,988 B1 * 1/2019 Farah ................. H04L 43/0876
10,367,705 B1 * 7/2019 Rodriguez ............. H04L 43/08

(Continued)

FOREIGN PATENT DOCUMENTS

KR 20190136723 A 12/2019

OTHER PUBLICATIONS

Cordingly, Robert, et al. "The serverless application analytics framework: Enabling design trade-off evaluation for serverless software." Proceedings of the 2020 Sixth International Workshop on Serverless Computing. 2020. (Year: 2020).*
Elsakhawy, Mohamed, and Michael Bauer. "FaaS2F: A framework for defining execution-sla in serverless computing." 2020 IEEE Cloud Summit. IEEE, 2020. (Year: 2020).*

(Continued)

Primary Examiner — Vivek Srivastava
Assistant Examiner — William C McBeth
(74) Attorney, Agent, or Firm — Compass IP Law PC

(57) ABSTRACT

Examples described herein relate to an apparatus that includes a memory and at least one processor where the at least one processor is to receive configuration to gather performance data for a function from one or more platforms and during execution of the function, collect performance data for the function and store the performance data after termination of execution of the function. Some examples include an interface coupled to the at least one processor and the interface is to receive one or more of: an identifier of a function, resources to be tracked as part of function execution, list of devices to be tracked as part of function execution, type of monitoring of function execution, or meta-data to identify when the function is complete. Performance data can be accessed to determine performance of multiple executions of the short-lived function.

19 Claims, 21 Drawing Sheets

(58) Field of Classification Search
CPC .............. H04L 41/5025; H04L 41/5032; H04L 43/08
See application file for complete search history.

(56) References Cited

U.S. PATENT DOCUMENTS

| | | | |
|---|---|---|---|
| 10,498,653 B2 | 12/2019 | Cook et al. | |
| 10,560,353 B1* | 2/2020 | Stickle | G06F 11/3409 |
| 11,018,965 B1* | 5/2021 | Ibryam | H04L 43/08 |
| 2007/0100987 A1* | 5/2007 | Aggarwal | G06F 11/3495 709/224 |
| 2011/0138389 A1* | 6/2011 | Molnar | G06F 11/3466 718/100 |
| 2012/0174120 A1* | 7/2012 | Malkiman | G06F 11/3466 719/313 |
| 2015/0154039 A1* | 6/2015 | Zada | G06F 11/302 718/1 |
| 2016/0226731 A1* | 8/2016 | Maroulis | G06F 11/3006 |
| 2017/0061566 A1* | 3/2017 | Min | H04L 43/0876 |
| 2018/0088997 A1* | 3/2018 | Min | G06F 11/3433 |
| 2019/0050258 A1* | 2/2019 | Kim | G06F 9/5005 |
| 2019/0188111 A1 | 6/2019 | Ozog et al. | |
| 2019/0372868 A1 | 12/2019 | Maroulis | |
| 2020/0028756 A1 | 1/2020 | Hale et al. | |
| 2020/0387438 A1* | 12/2020 | Carrington | G06F 11/3404 |
| 2021/0168036 A1* | 6/2021 | Qian | H04L 43/08 |
| 2022/0121548 A1* | 4/2022 | Cao | G06F 11/3466 |
| 2022/0147430 A1* | 5/2022 | Haas Costa | G06F 11/3409 |

OTHER PUBLICATIONS

Shahrad, Mohammad, Jonathan Balkind, and David Wentzlaff. "Architectural implications of function-as-a-service computing." Proceedings of the 52nd annual IEEE/ACM international symposium on microarchitecture. 2019. (Year: 2019).*
"AWS Lambda Developer Guide", AWS, Mar. 5, 2020, 684 pages.
"Serverless web performance monitoring using Cloud Functions", https://cloud.google.com/architecture/serverless-web-performance-monitoring-using-cloud-functions, last updated Jul. 18, 2019, 2 pages.
Bashir, Faizan, "What is Serverless Architecture? What are its Pros and Cons?", Hackernoon, https://hackernoon.com/what-is-serverless-architecture-what-are-its-pros-and-cons-cc4b804022e9, May 19, 2018, 20 pages.
Dunham, Casey, "AWS Lambda with Python: A Complete Getting Started Guide", Stackify, by Netro, https://stackify.com/aws-lambda-with-python-a-complete-getting-started-guide/, Jun. 22, 2019, 31 pages.
Isabel, Mathieu, "Hardware Performance Monitoring Deep Dive using Intel Performance Counter Monitor", Mathieu Isabel's Weblog, https://unhandled.wordpress.com/2017/05/17/hardware-performance-monitoring-deep-dive-using-intel-performance-counter-monitor/, May 17, 2017, 5 pages.
Nemer, Joe, "Google Cloud Functions vs. AWS Lambda: The Fight for Serverless Cloud Domination", Amazon Web Services Blog, https://cloudacademy.com/blog/google-cloud-functions-vs-aws-lambda-the-fight-for-serverless-cloud-domination/, Sep. 6, 2019, 8 pages.
International Search Report and Written Opinion for PCT Patent Application No. PCT/US20/66735, Mailed Apr. 19, 2021, 10 pages.

* cited by examiner

PERFORMANCE MONITORING FOR SHORT-LIVED FUNCTIONS

Data centers provide vast processing, storage, and networking resources to users. For example, client devices can leverage data centers to perform image processing, computation, data storage, and data retrieval. A client device such as a smart phone, Internet-of-Things (IoT) compatible device, a smart home, building appliance (e.g., refrigerator, light, camera, or lock), wearable device (e.g., health monitor, smart watch, or smart glasses), connected vehicle (e.g., self-driving car or flying vehicle), and smart city sensor (e.g., traffic sensor, parking sensor, or energy use sensor). In addition, processes executing on computing resources within a data center can request use of processes executed on other computing resources, accelerators, and other devices provided by a data center.

DETAILED DESCRIPTION

Figure 1:
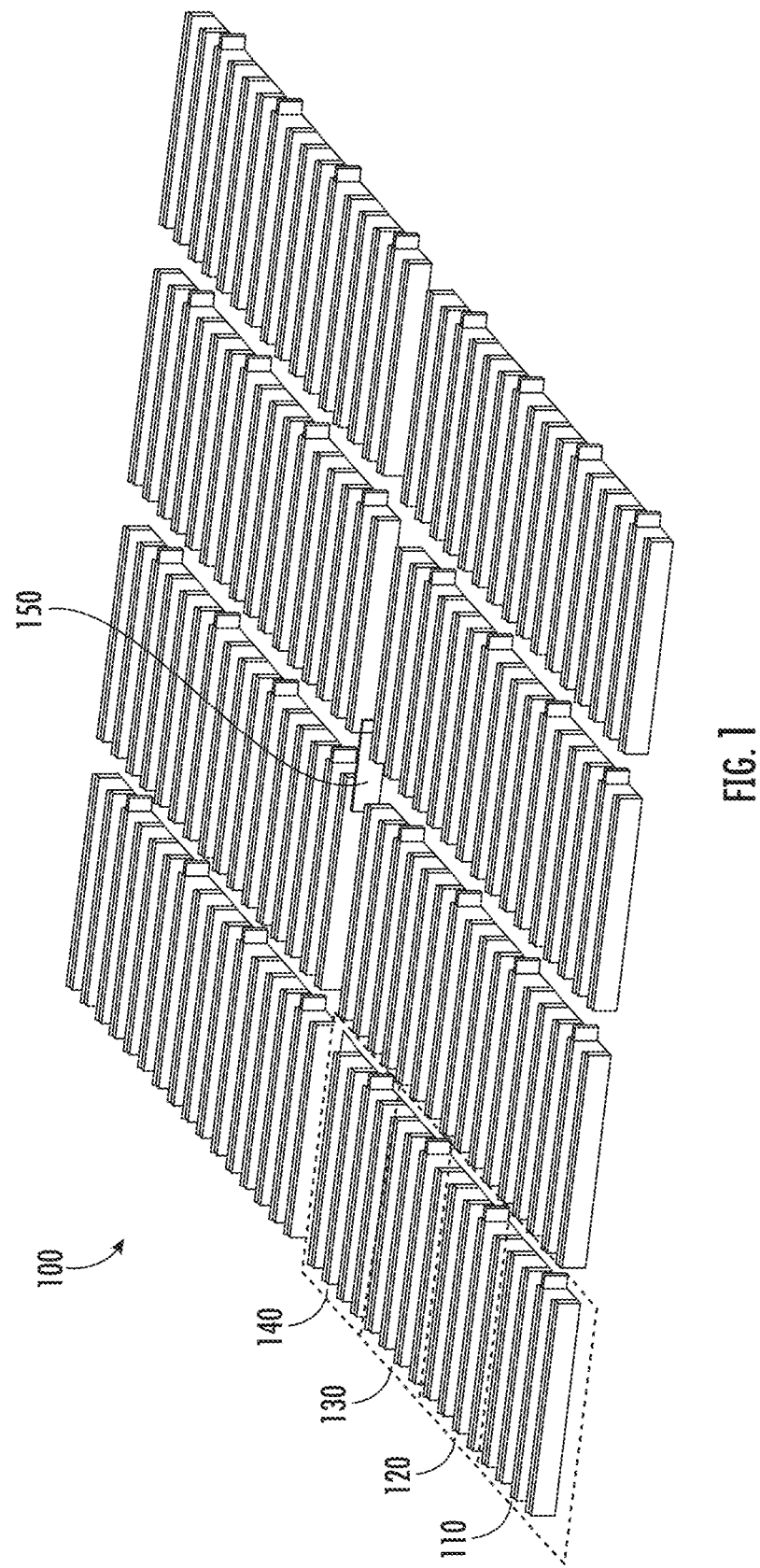
FIG. 1 is a simplified diagram of at least one embodiment of a data center for executing workloads with disaggregated resources.

FIG. 1 depicts a data center in which disaggregated resources may cooperatively execute one or more workloads (e.g., applications on behalf of customers) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composite node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniB and or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
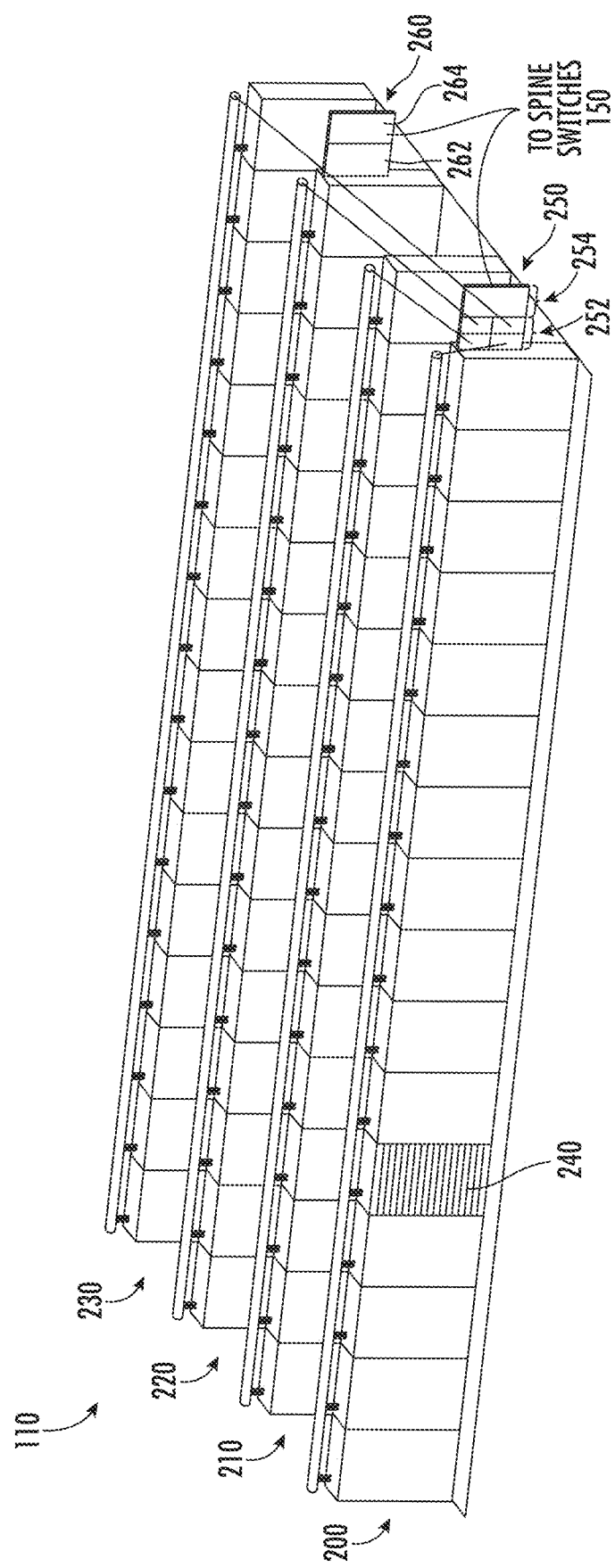
FIG. 2 is a simplified diagram of at least one embodiment of a pod that may be included in a data center.

FIG. 2 depicts a pod. A pod can include a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
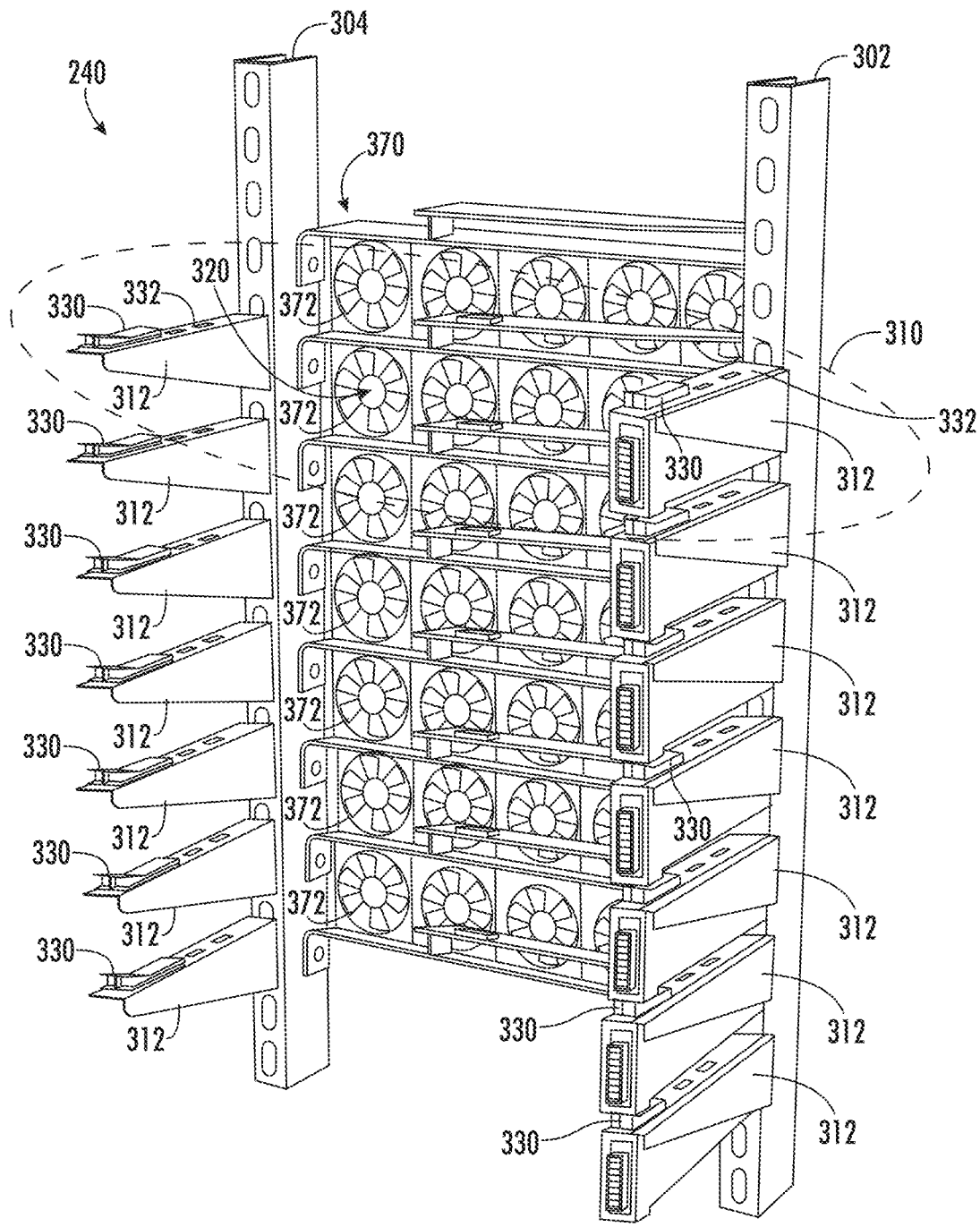
FIG. 3 is a perspective view of at least one embodiment of a rack that may be included in a pod.
Figure 4:
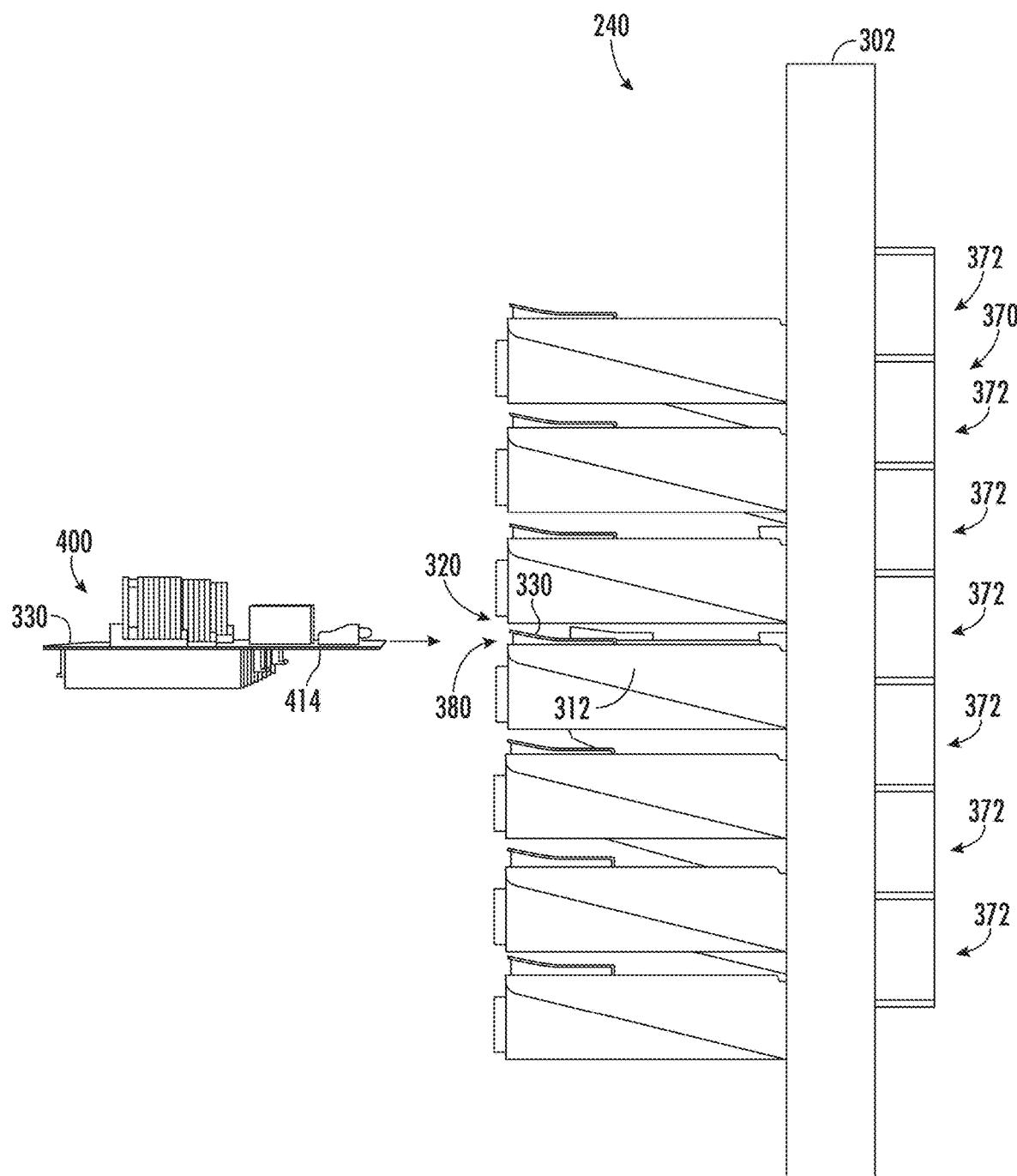
FIG. 4 is a side elevation view of a rack.
Figure 5:
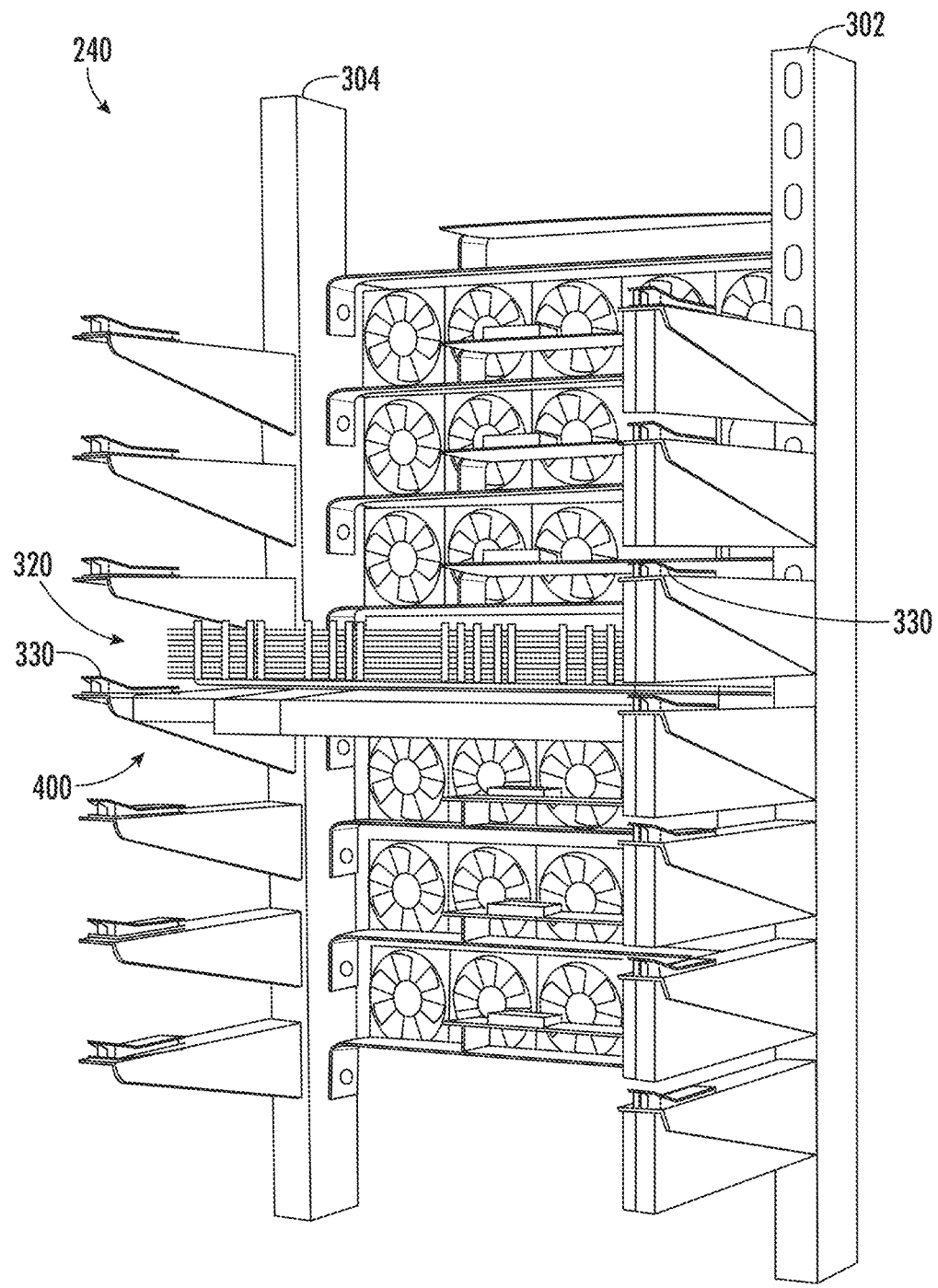
FIG. 5 is a perspective view of a rack having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less (no chassis) circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulatable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism. The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
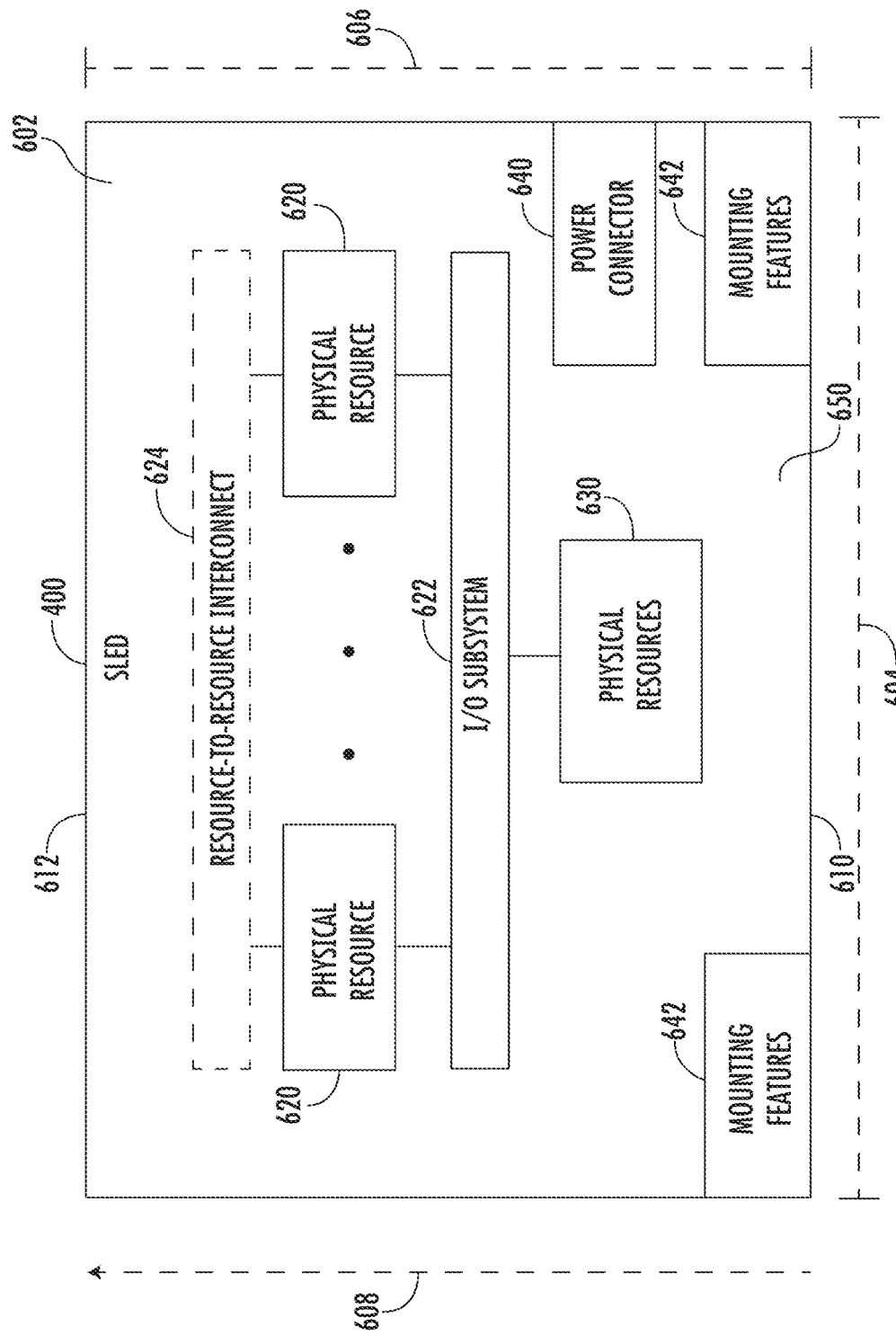
FIG. 6 is a simplified block diagram of at least one embodiment of a top side of a sled.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), PCI express (PCIe), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
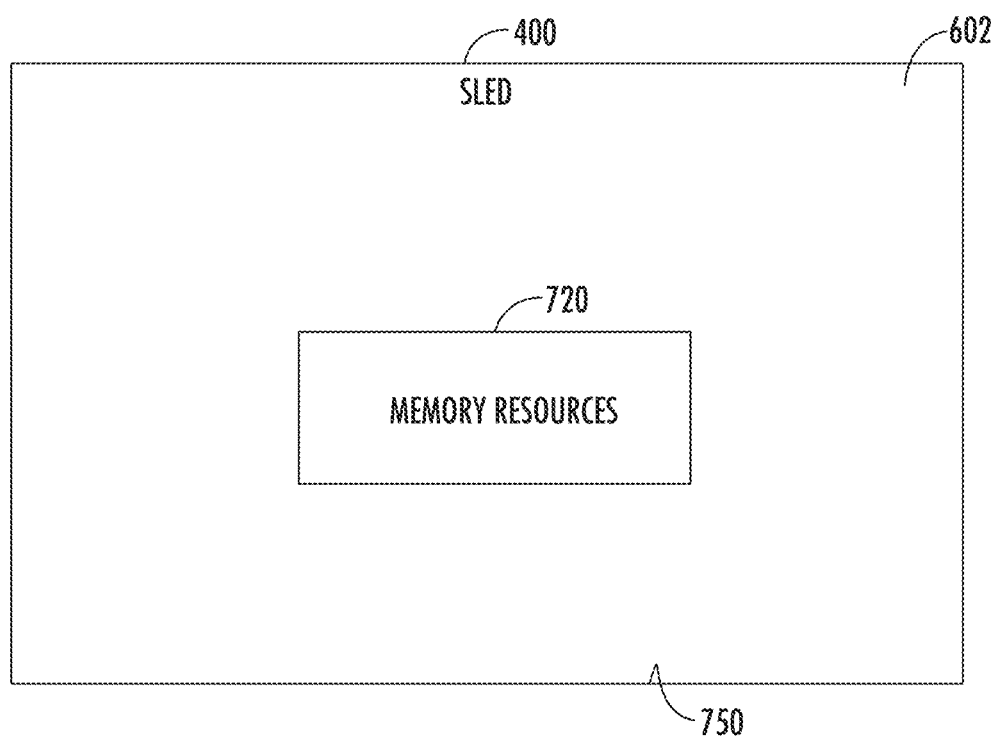
FIG. 7 is a simplified block diagram of at least one embodiment of a bottom side of a sled.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A block can be any size such as but not limited to 2 KB, 4 KB, 8 KB, and so forth. A memory device may also include next-generation nonvolatile devices, such as Intel Optane® memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), Intel® Optane™ memory, a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
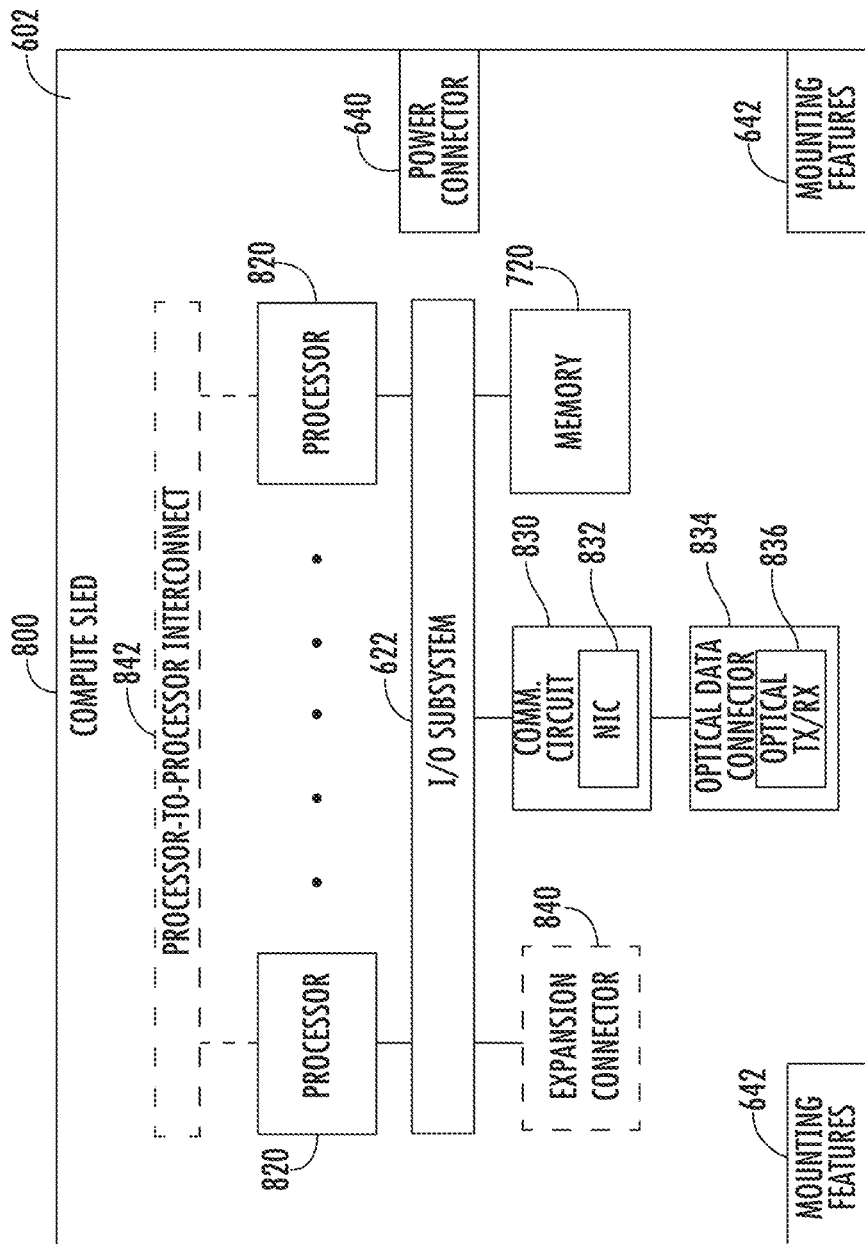
FIG. 8 is a simplified block diagram of at least one embodiment of a compute sled.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high-power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications (e.g., PCIe).

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally, or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
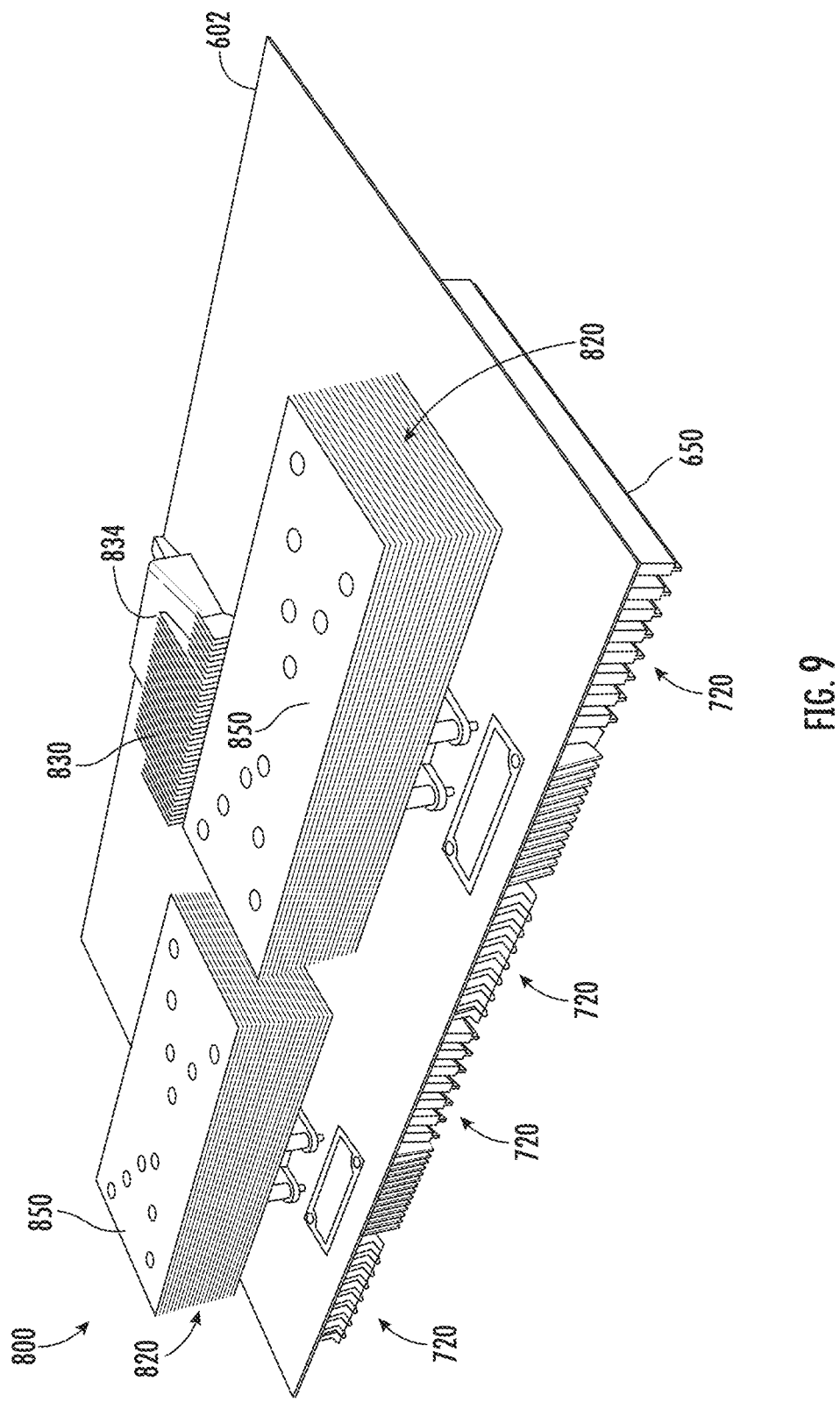
FIG. 9 is a top perspective view of at least one embodiment of a compute sled.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
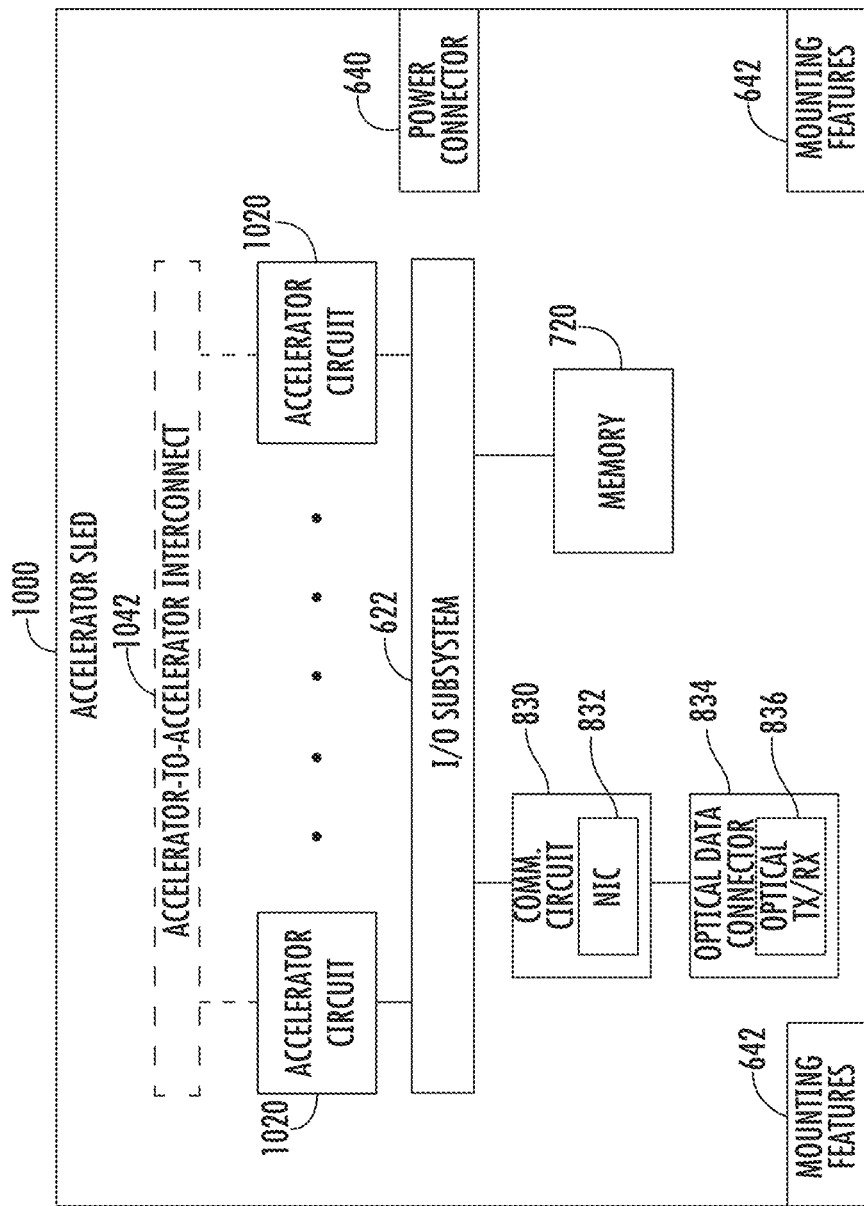
FIG. 10 is a simplified block diagram of at least one embodiment of an accelerator sled usable in a data center.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
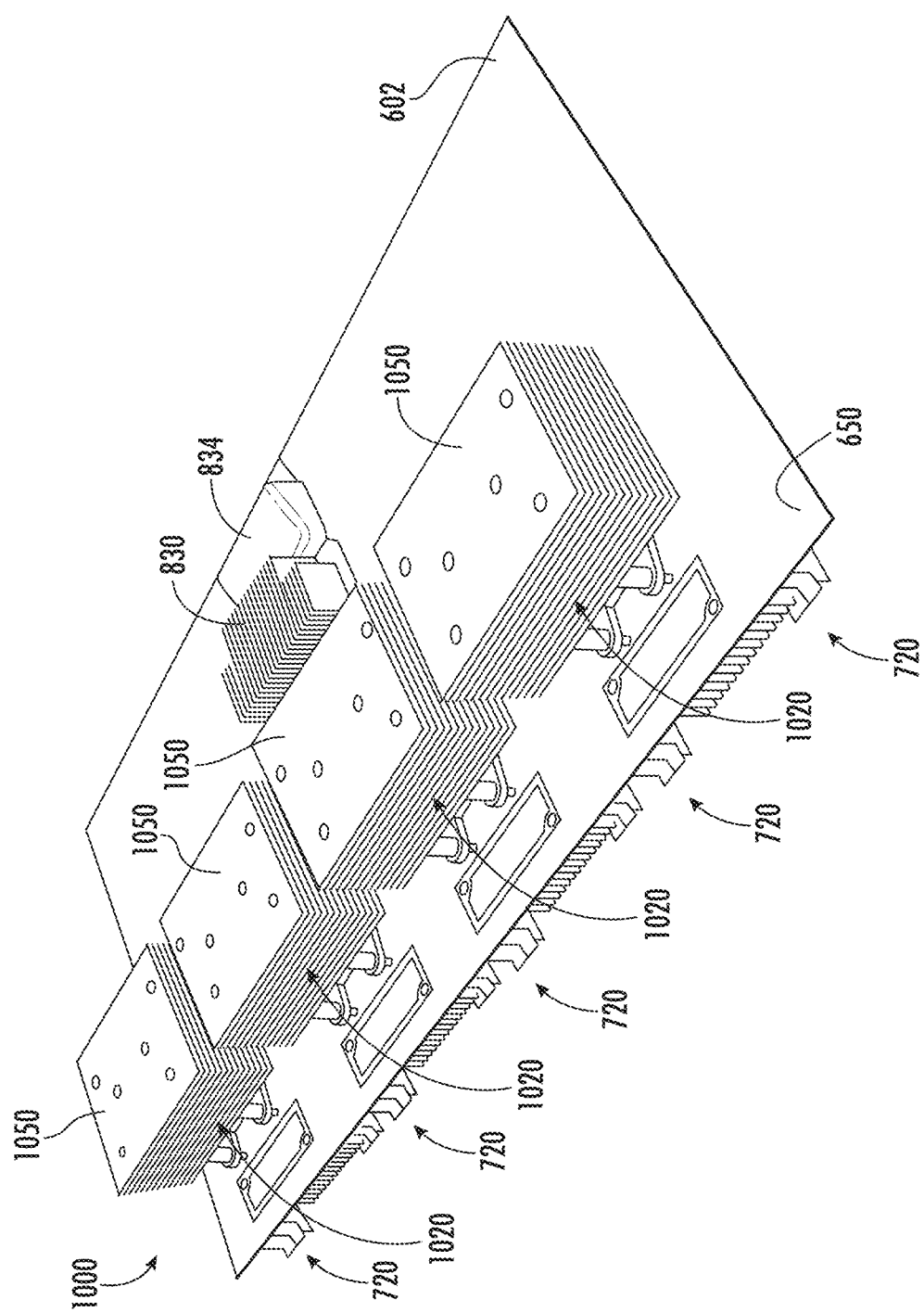
FIG. 11 is a top perspective view of at least one embodiment of an accelerator sled.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
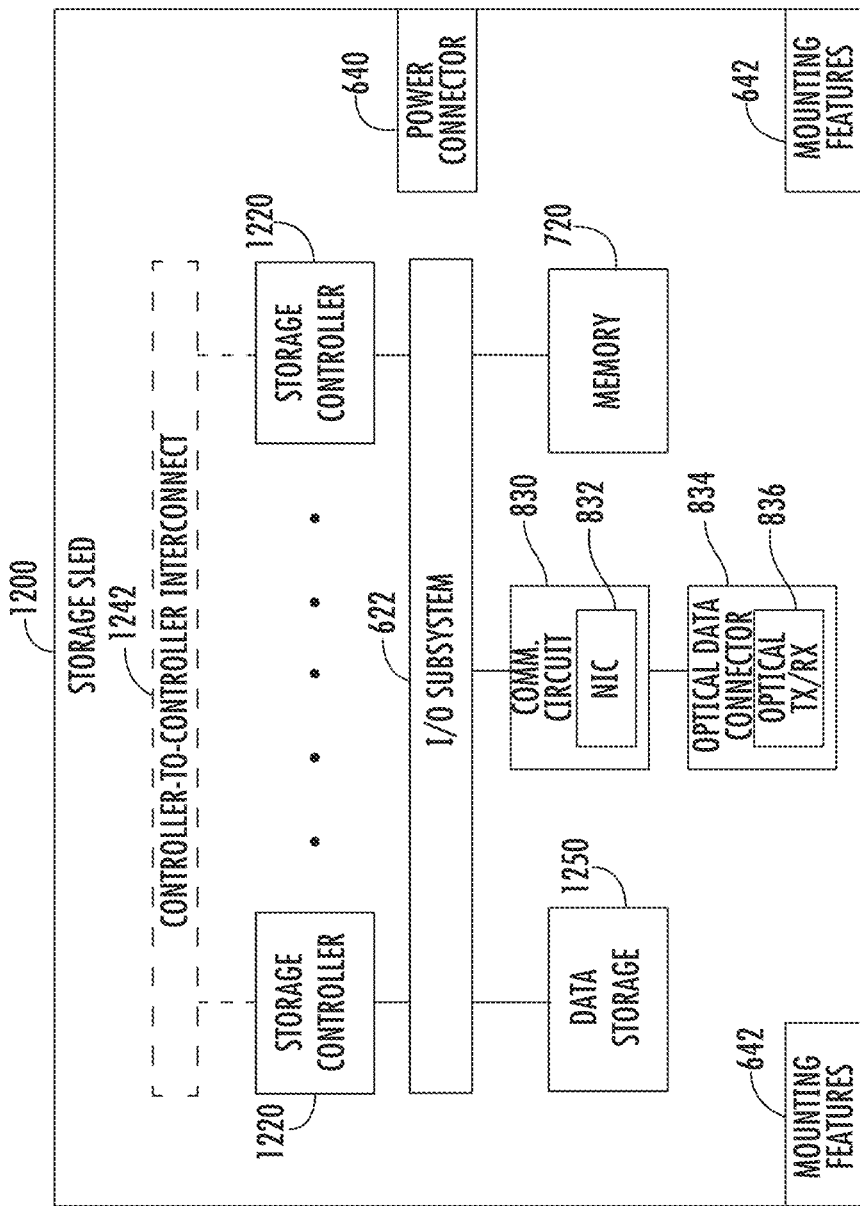
FIG. 12 is a simplified block diagram of at least one embodiment of a storage sled usable in a data center.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above with regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
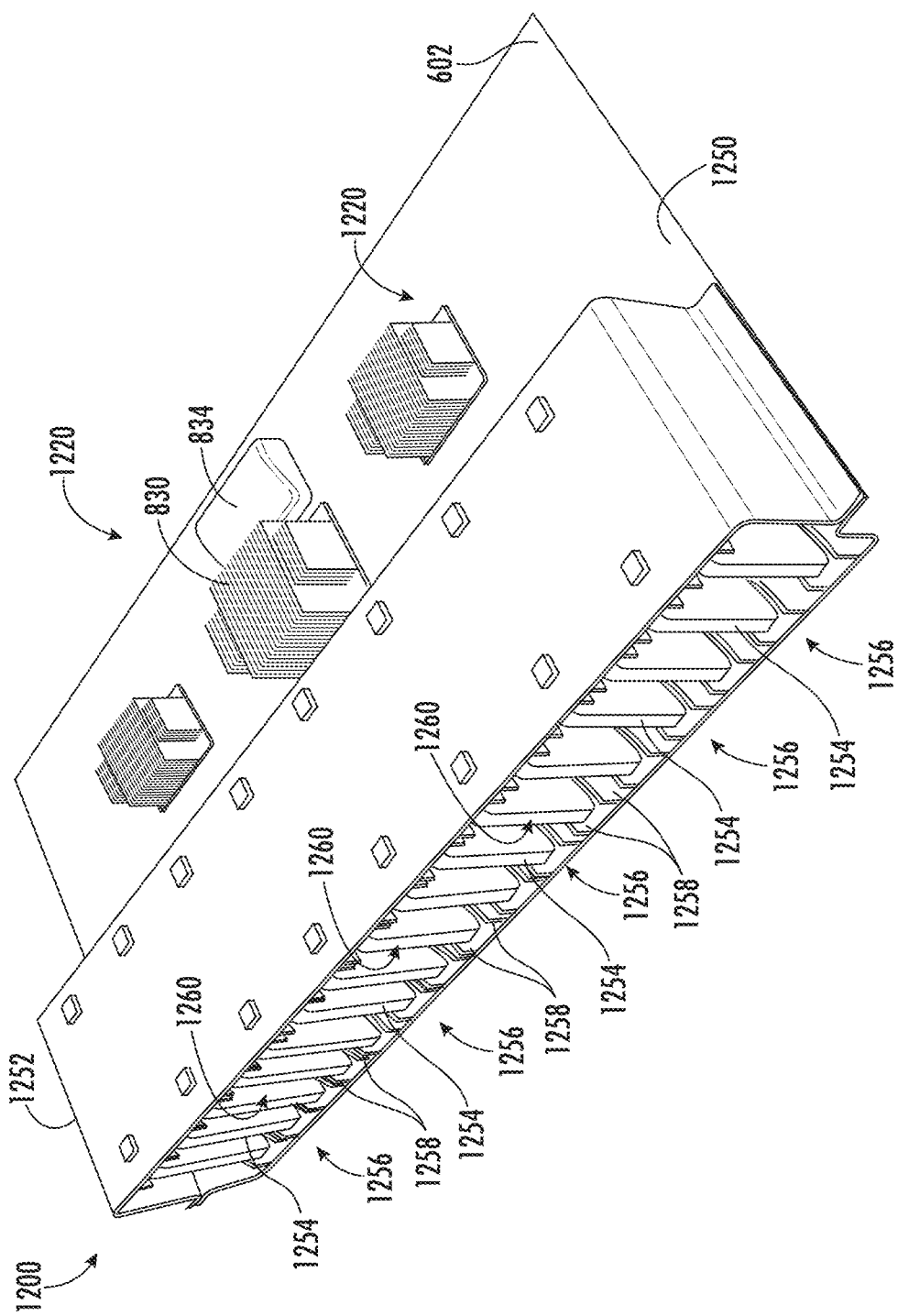
FIG. 13 is a top perspective view of at least one embodiment of a storage sled.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto.

As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
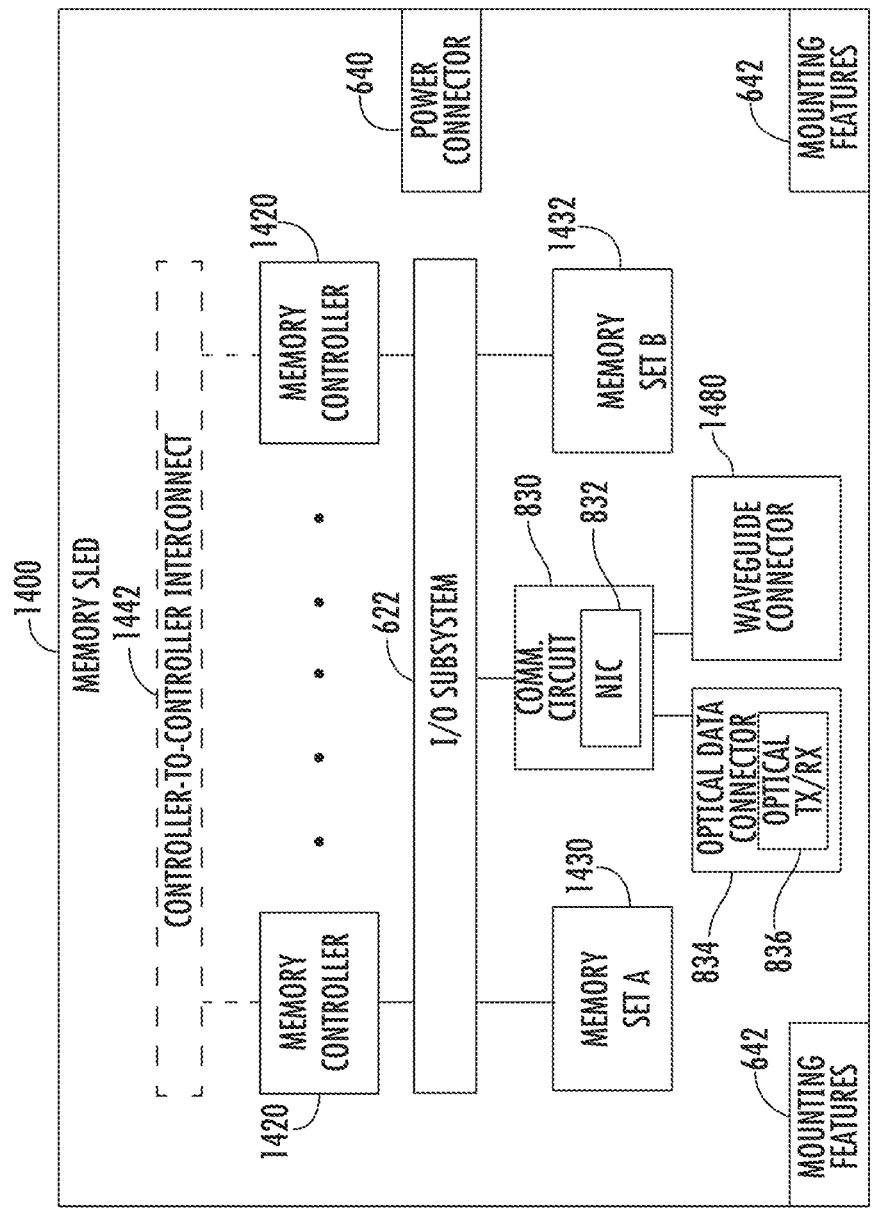
FIG. 14 is a simplified block diagram of at least one embodiment of a memory sled usable in a data center.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
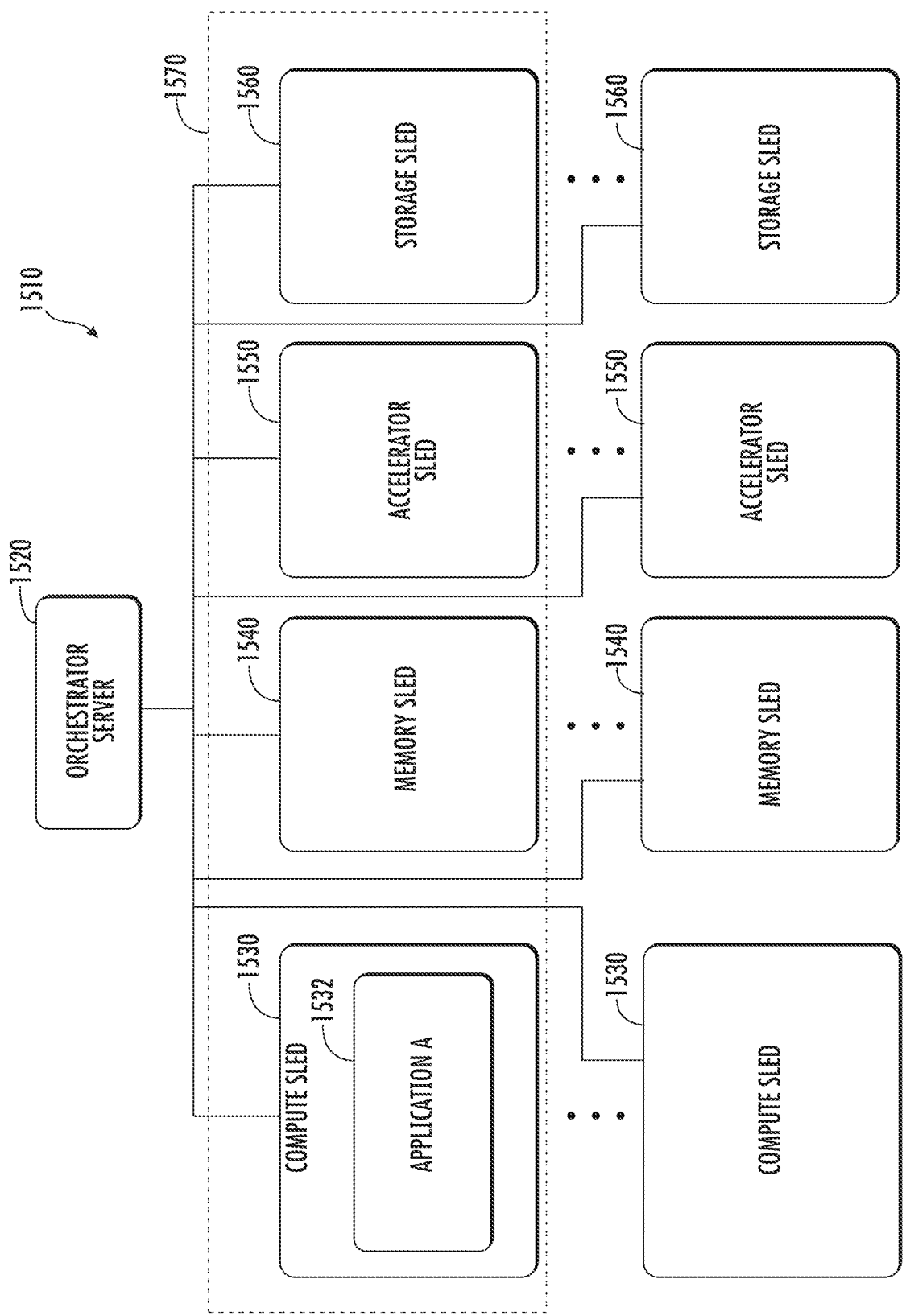
FIG. 15 depicts a system for executing one or more workloads.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., a target throughput, a target latency, a target number instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 1520 may identify patterns in resource utilization phases of the workloads and use the patterns to predict future resource utilization of the workloads.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Monitoring of Serverless Functions

Edge computing is an emerging paradigm where computers, such as a data center of computing resources, are located physically closer to network access points that are in communication with the client devices. For example, an edge computing data center can be physically close or within the same physical room or building as a base station or network connections in communication with client devices. The communication base station or network connections can route requests for data processing or data transmission to the edge computing system. Edge computing is an emerging paradigm where there is a need for ultra-low latency responses from edge services.

A serverless application or function (e.g., Function as a Service (FaaS)) can use available computing resources at a data center, edge computing device, or fog network device. For example, for a serverless application, a cloud service provider dynamically manages allocation and provisioning of servers and a serverless application runs in stateless compute containers that are event-triggered and may last for one invocation. A serverless application can be event-driven, cloud-based application where application development relies on a combination of third-party services, client-side logic and cloud-hosted remote procedure calls. Serverless application can be pay-per-use computing or bare-code where users are charged based on time and computing resources (e.g., CPU, networking, or memory) allocated to run serverless application without associated fees for idle time of computing resources. In some examples, a serverless application or function can be performed by a network infrastructure device (e.g., forwarding element, router, switch, network interface controller) or accelerator, in addition or alternative to use of a server or general purpose computing platform.

Figure 16:
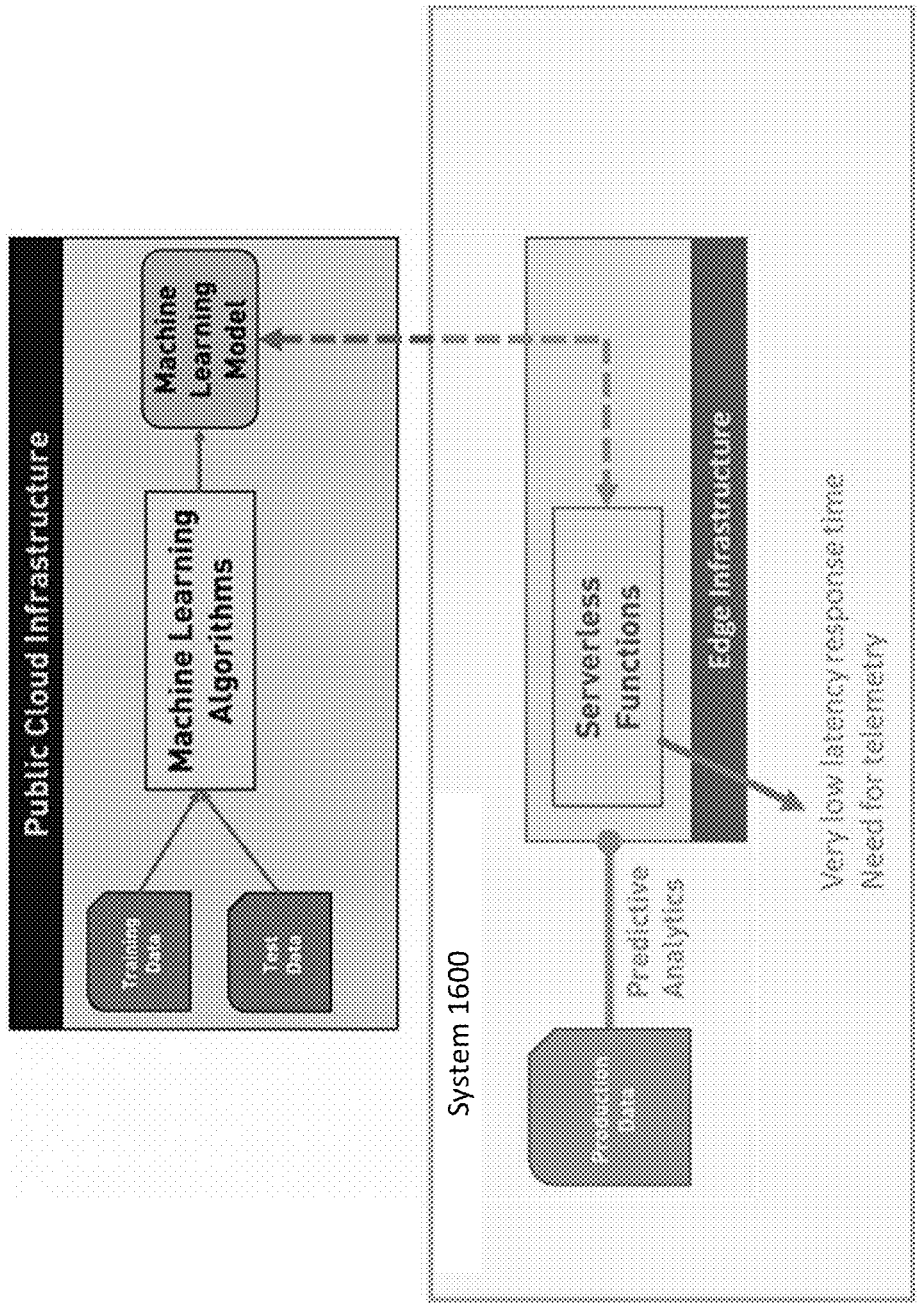
FIG. 16 depicts shows an example of multiple FaaS for various video analytics functions.

FIG. 16 depicts shows an example of multiple serverless functions running on system 1600 to perform various video analytics functions (e.g., face detection, object detection, and so forth) using a machine learning model. Performance of serverless functions at edge infrastructure can provide efficient execution and low latency performance. Historically, performance analysis has been done by sampling CPU performance counters to understand the behavior of their applications. With the introduction of FaaS and the processing of short-lived serverless functions, for example, the typical sampling is every 5 milliseconds and records over 100 counters. However, if the function executes in less than 5 milliseconds, there is very little data that can be retrieved and attributed directly to a short-lived application or function call. For example, a short-lived computing application or function can execute between 5 milliseconds to several seconds (e.g., 5 seconds), or longer or shorter durations. System 1600 can execute thousands of serverless functions concurrently and compete for CPU time. For example, within a 5 ms sample interval, performance counter collection can contain event counts for 1/10th of an execution of a FaaS, 1/5th of execution of another FaaS, and so forth. Some serverless functions (e.g., FaaS) execute so fast that a sample count for the functions is low. Moreover, performance counters could refer to any function running on core. With faster sampling rates, execution of applications can be interfered with. As a result of this, attributing the performance to a specific FaaS, particularly a short-lived FaaS, is difficult.

Figure 17:
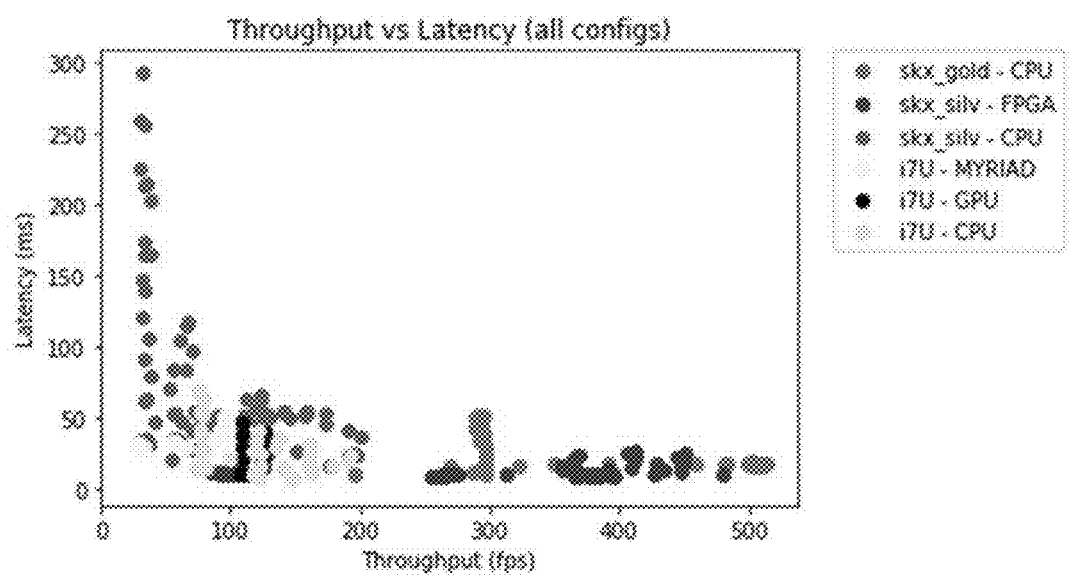
FIG. 17 depicts an example of latency of FaaS for a video analytics scenario.

FIG. 17 depicts an example of latency of FaaS for a video analytics scenario. Every grayscale color represents latency of a particular FaaS. Latency can represent how long an FaaS executes. In some cases, a workload across architectures has an execution time of less than a millisecond. Throughput represents how much work is performed during execution of an FaaS. Some FaaS run for short durations and perform relatively more work during the short duration whereas some FaaS run for longer durations and perform work over the duration.

Each of the points shows the average latency for a particular experiment where a particular FaaS type was utilized multiple times by one or multiple clients. The overall system platform throughput for that FaaS is shown. As can be observed, for a particular FaaS, there are a variety of latencies depending on what is the hardware utilized and under what circumstances FaaS are called. The important aspect illustrated is that many FaaS may run for less than a millisecond with a high throughput workload. For example, a FaaS can run single digit microseconds to update a data base entry.

Tools such as perf or Linux perf-stat are effective with traditional software that is usually long lived but are not effective with shorter-lived FaaS. Sampling is even trickier when a system has thousands of running functions and correlating the counters back to the specific function that was executed. It can be challenging to monitor system performance for shorter lived stateless FaaS.

With a growing number of vendors of platforms with FaaS capabilities, there will be a need for more debug capability. A vendors of platforms with FaaS capabilities can offer function-level performance monitoring. Various embodiments can track resource utilization for at least one function potentially including at least one short-lived function. In some examples, a cloud service provider can execute a process that causes dispatch and execution of one or more of: at least two different functions on any computing resources; execution of a function for execution on multiple different computing resources at the same, overlapping, or different times; or execution of a function on the same computing resource at different times.

Figure 18:
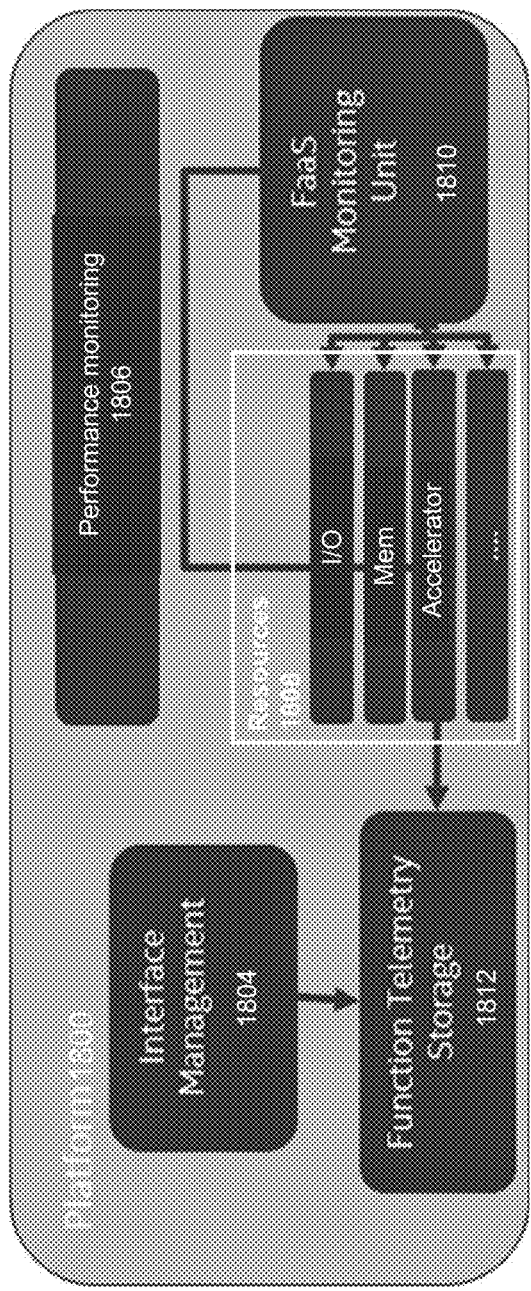
FIG. 18 shows an overview of a system in accordance with some embodiments.

FIG. 18 shows an overview of a system in accordance with some embodiments. One or more serverless functions or FaaS can be deployed for execution on a platform to use one or more computing resources 1808 (e.g., networking, memory, accelerators, and so forth). Prior to execution of a serverless function or FaaS to use a computing resource, a software stack (e.g., application, operating system, virtualized execution environment, hypervisor, or performance monitoring software) registers the function with interface management 1804 for tracking by an identifier (e.g., a numeric value). The software stack can register the function or functions by one or more instruction addresses, bit-stream IDs, and so forth.

FaaS Monitoring Unit (FMU) 1810 can track activity during operation of a particular FaaS and collect corresponding performance data for the utilized resources (e.g., cores, memory, cache hierarchies, discrete devices, I/O etc.). As the execution of a function starts, as identified by the registration meta-data, FMU 1810 can collect telemetry and performance monitoring information for that function generated by performance monitoring system 1806 during execution of the function. FMU 1810 can extract performance counters from different devices (e.g., CPUs, GPUs, memory, accelerators, interfaces). If the function is preempted (e.g., execution is paused or halted), FMU 1810 may not collect telemetry and performance monitoring information for that function. Once the function is finished, such as when a last instruction address for the function is executed, an end of bit-stream is reached, terminated as a result of error or administrative intervention, or any other specified mark, FMU 1810 can store the telemetry and performance monitoring information for that function into telemetry storage 1812. Performance monitoring information and telemetry storage 1812 can be accessed afterwards by a FaaS performance requester or customer or performance tracker, subject to the right permissions.

A performance monitoring (PMON) system 1806 can collect performance counters and telemetry information while a function of interest executes. In some examples, processor-executed software can monitor performance. For example, a collected daemon can be executed to gather telemetry information.

For a function, telemetry data collected for function execution on the platform can be stored as an average of function execution or as samples of the function at an interval which can depend on the length of function execution (e.g., sample per 200 microseconds or other duration of time if the function is expected to execute more than 200 microseconds per execution for multiple executions). In some examples, telemetry can be collected for execution of the function with the same identifier (e.g., unique user identifier (UUID)) on one or more other platforms. Hence, FMU 1810 can collect telemetry and performance monitoring from the platform 1800 and different devices for a particular UUID and stores the telemetry and performance monitoring into function telemetry storage 1812 after the function has finished or terminated as a result of error.

Subject to having permission, various entities can retrieve telemetry and performance monitoring data for a UUID or other identifier of a function from function telemetry storage 1812. The telemetry and performance monitor data can be provided in a graph or as a chart, with underlying data available to view. The data can reflect telemetry and performance monitoring data of one or more executions of a function or premature termination of the function. For example, a developer can use the data to evaluate resource utilization of a FaaS and determine if the FaaS is to be modified to reduce resource utilization or improve throughput. A cloud service provider (CSP) can evaluate if a service level agreement (SLA) for a FaaS is satisfied or violated by evaluation of telemetry or performance data, and the CSP can allocate more resources to a FaaS that is not meeting an SLA. If an SLA is met or exceeded, the CSP can reduce resource allocation to the FaaS.

Figure 19:
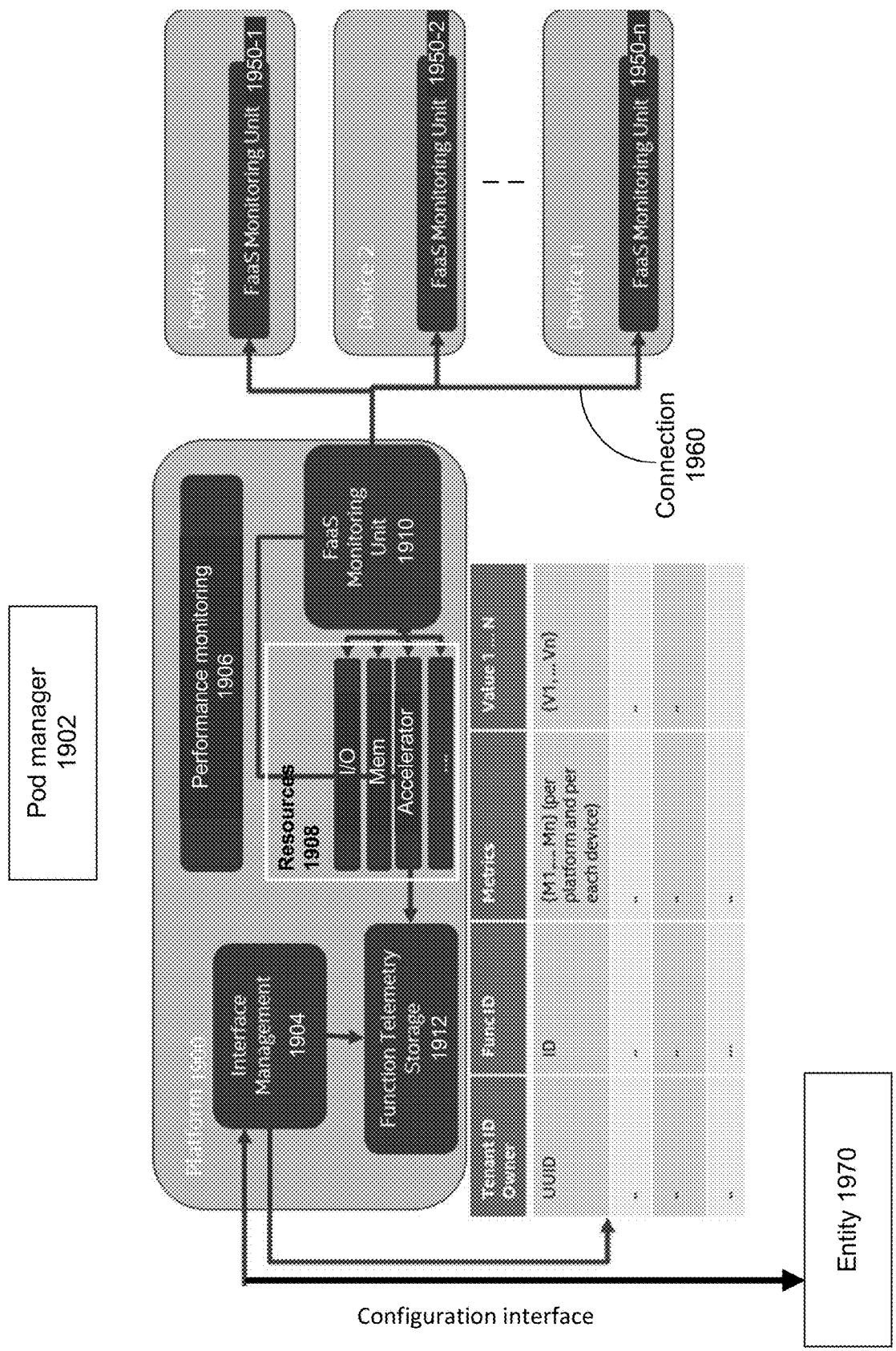
FIG. 19 depicts an architecture that can implement a fine grain stateless function telemetry architecture.

FIG. 19 depicts an architecture that can implement a fine grain stateless function telemetry architecture. Any type of serverless functions provided to a CSP's platform can be uploaded or retrieved for execution using one or more computing resources. The CSP can decide how the function is to be executed (e.g., scaling, load balancing, use of virtualized execution environments, use of particular libraries). For example, a function can be written in JavaScript, Java, .NET, Python, OpenGL, OpenCL, DirectX, Python, DPC++, TensorFlow, Metal, CUDA®, TensorFlow, scikit-learn, Keras, or PyTorch, or any other language. A function can be written in a scripting language or compiled code, binary, executable code segment. A serverless function can be a database program, voice recognition inference, image recognition, augmented reality overlay, and so forth.

A pod manager 1902 (or other hardware and/or software entity) can select one or more of resources 1908 to perform a function. Resources 1908 can include hardware and software resources available for use to perform selected functions or FaaS. Resources 1908 can offer one or more of: processors, accelerators, volatile or non-volatile memory, a neural network, memory pools, or storage pools. Processors can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) and programmable logic controllers (PLCs). A neural network can be embodied as a separate neural network device use any components of processors. Multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. Processors may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein.

Any processor can execute a virtualized execution environment. A virtualized execution environment can include at least a virtual machine, process containers, machine containers, or application processes. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include access of memory by a particular container but not another container. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

Interface management 1904 can receive registration of a function executing using a device among resources 1908 that is to be tracked by FMU 1910. FMU 1910 provides an interface management 1904 to allow entity 1970 (e.g., any tracing tool or collector tool such as Intel® VTune™ or collectd) to specify the tracking of a particular function by specifying one or more of: a UUID, function identifier (ID), resources to be tracked as part of FaaS execution, list of devices to be tracked as part of FaaS execution, type of monitoring of FaaS execution, or meta-data to identify when the function is done. A UUID can identify a tenant or function (e.g., FaaS) and can be a combination of one or more of: an identifier for a tenant, Process Address Space ID (PASID) for the application calling or requesting function execution, or an identifier of a function. A tenant can include a user or client that launches a function. A process can be mapped to a tenant for example and be identified by a PASID. In some cases, a software stack 1906 (e.g., tracing tool or collector tool) may be monitoring how many resources a particular tenant/user is using.

In some cases, a unique UUID can be provided per function invocation. A function can process different data for a workload so different unique IDs per invocation can allow differentiation between different workloads performed by a function. In some examples, a unique function ID is provided per function invocation but the UUID is not changed if the tenant is the same.

In some examples, a list of devices to be tracked as part of execution of a function can be identified per device by: device ID and list of resources to be tracked. A device ID can be specified for a device that is executing a function (e.g., GPU0, GPU1, CPU0, CPU1, accelerator0, NIC1). A list of resources used by the function to be tracked can be specified (e.g., core 1, lower level cache (LLC), etc.). A device ID can uniquely identify a device and be provided by a manufacturer of a device (e.g., MAC address for a network interface). Various aspects of resource usage can be specified, such as one or more of: metrics to track or frequency that the metric is to be sampled (e.g., 100 microseconds or other frequency). Metrics to track can include: memory bandwidth utilization, memory size usage, memory allocation, core clock frequency speed, core clock cycle utilization, networking bandwidth used, core idle measurement, core execution of user space processes, core waiting for an input/output operation to complete, cache allocation/utilization, network interface bandwidth (transmit or receive) utilization, CPU cycle utilization, GPU cycle utilization, database transactions/second, collected telemetry, performance monitoring unit (PMU) counters, performance monitoring counters (PMON), performance counter monitor (see, e.g., Willhalm, "Intel® Performance Counter Monitor—A Better Way to Measure CPU Utilization" (2017)), and the like. Frequency that a metric is to be sampled can refer to a frequency of recording a metric.

Type of monitoring to be applied to the function can indicate how to report performance metrics of resources used by an execution of a function. In some examples, after a function completes or is terminated, an average for metrics per resource can be determined, stored, and available for reporting. In some example, sampling of metrics occurs and a result can be a list of time intervals and the corresponding average values during the time intervals. Other statistical estimators such as maximum, minimum, median values of recorded performance metrics and telemetry can be determined, stored in storage 1912, and available for reporting.

Meta-data to identify when the function is completed can be used to indicate when to measure performance metrics of a function. For example, a particular event, or other indicator can be specified to indicate when a function is completed.

Based on configuration using interface management 1904, FMU 1910 can track metrics and performance data for identified functions executing using resources 1908. If the device among resources 1908 does not include capability to provide metrics or telemetry for an executing function, FMU 1910 can extract the metrics and telemetry itself from the device among resources 1908 while the function is executed at a specified frequency.

FMU 1910 can gather telemetry for a particular function by collecting telemetry from platform 1900 as well from one or more of FMU 1950-1 to 1950-*n* used by other platforms via connection 1960 and store telemetry into telemetry storage 1912. For example, FMU 1910 can collect and aggregate counters measured for a UUID by one or more of FMU 1950-1 to 1950-*n*. For example, even across different machines or platforms, the same unique ID for a function can be used to aggregate telemetry for different executions of the same function. But differentiation among workloads and resources used to perform a function can be made by identifiers of resources used, identifier of a tenant, or identifier of the application calling the function. FMU 1910 can use telemetry storage 1912 to store temporary data during the time life of the function that will be used to compute the final telemetry data. FMU 1910 can use the temporary data after detecting that the function is finished, in order to compute telemetry for the function. Telemetry storage 1912 can store both temporary and final telemetry data for a monitored. A table from telemetry storage 1912 can be indexed by a UUID or function ID.

FMU 1910, depending on the access mode provided by the service, can notify an entity 1970 after the function ends execution and the telemetry is available to entity 1970. Entity 1970 can be for example, one or more of: an application, hypervisor, operating system, virtualized execution environment, or performance monitor. Accordingly, telemetry for at least two different functions or a function executed on any platform or at different times can be measured and made available for inspection or viewing.

Connection 1960 can provide communications between platform 1900 and FMU 1950-1, 1950-2, and 1950-*n* and can be compatible or compliant with one or more of: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe. For example, any device connected to platform 1900 via a switch can provide performance measurements and metrics to platform 1900.

Interface management 1904 allows entity 1970 to gather telemetry for a particular function execution. Interface management 1904 can be used to specify one or more of: ID for the function or mode of data collection such as pull mode (e.g., entity 1970 requests data collection) or push mode (e.g., FMU 1910 will call entity 1970 to indicate telemetry data for a particular UUID is available).

FMU 1910 can protect data per tenant by encryption in storage 1912 in order to protect privacy of the data. FMU 1910 may decide to remove telemetry from the storage once it becomes obsolete to protect against unauthorized access.

A developer or customer can profile performance of an application by performance monitoring information in telemetry storage 1912. For example, a CPU cache miss counter can indicate when the data is not found in cache. A CPU cache miss counter can indicate performance of the application. Because counters are measured periodically for short-lived functions, multiple performance measurements can be aggregated into storage 1912 for different executions of the short-lived function. When a function utilizes resources, resources used per execution of a function are specified and identified. Despite resources being shared with other functions, by considering multiple invocations of a function for different workloads and on different resources, a developer or customer can filter out performance impacts from other functions and performance measurements using specified resources for a particular short-lived function(s) or non-short lived functions of interest. For example, presentation can be made of performance measurements of two or more functions or applications or executions of a function. Presentation can be made in a file, graphic or chart on a web page or mobile application, augmented reality overlay, or other manners.

Figure 20:
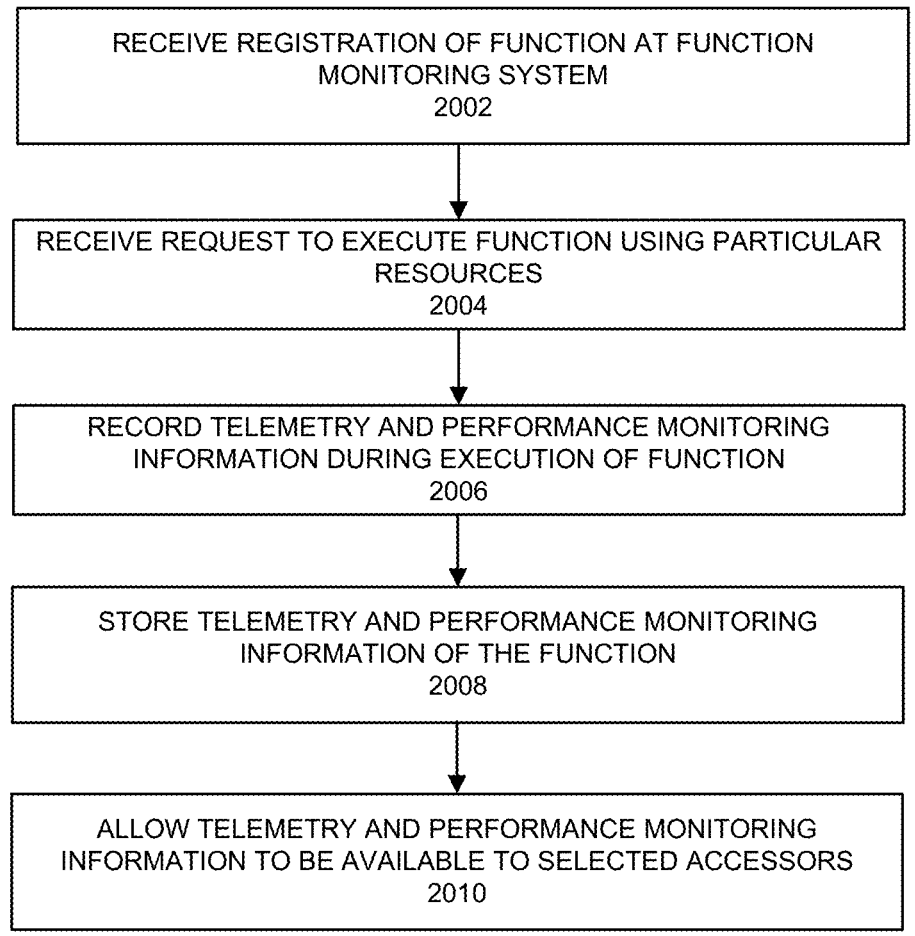
FIG. 20 depicts a process.

FIG. 20 depicts a process. At 2002, a function can be registered with a function monitoring system. For example, for a particular request, one or more of the following can be provided: a function execution identifier (e.g., UUID and/or function ID), resources to be tracked as part of function execution, list of devices to be tracked as part of function execution, type of monitoring of function execution, or meta-data to identify when the function is done. An identifier can be used indicate any instance of execution of a function as opposed to the same identifier for all executions of the function. As different executions of the same function but using different data could result in different performance, an execution of the function can be tracked using a different identifier.

At 2004, a request is received to cause execution of a function using particular resources. A function can be written in a scripting language or compiled code, binary, executable code segment. Resources available for use can include one or more of: processors, accelerators, volatile or non-volatile memory, a neural network, memory pools, or storage pools.

At 2006, telemetry and performance monitoring occurs for a function while executing on a platform. Recording can occur after completion of the function or at particular intervals. At 2008, telemetry and performance monitoring information of the same function executed on one or more other platforms takes place. A telemetry storage device can store the telemetry and performance monitoring information of the same function executed on one or other platforms.

At 2010, the telemetry and performance monitoring information of a function are made available for access by selected entities. For example, a function developer can access the telemetry and performance monitoring information for use to determine how to modify instructions of the function to improve resource utilization or identify bugs or errors in the function. By having telemetry and performance monitoring information from multiple executions of a function on different platforms and different workloads available for access by use of specific identifiers, a developer can glean performance characteristics of short-lived functions. In some examples, a report or graph can be presented to a customer via a webpage or mobile application indicating resource utilization or performance of at least one function, at least two different functions, at least two different executions of the same function, and so forth.

Figure 21:
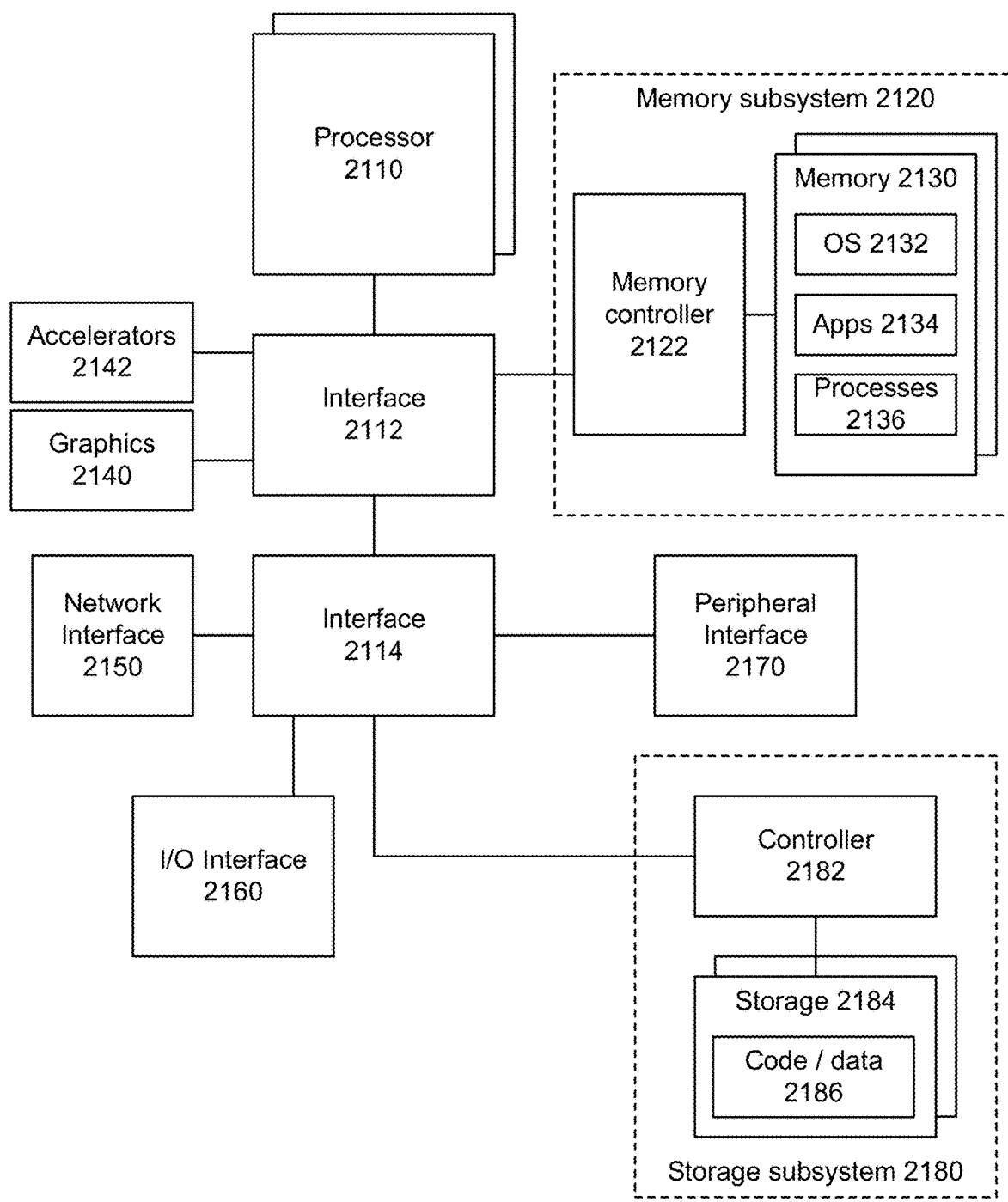
FIG. 21 depicts a system.

FIG. 21 depicts a system. The system can use embodiments described herein at least to use monitor performance of short-lived functions. System 2100 includes processor 2110, which provides processing, operation management, and execution of instructions for system 2100. Processor 2110 can include any type of microprocessor, central processing unit (CPU), graphics processing unit (GPU), processing core, or other processing hardware to provide processing for system 2100, or a combination of processors. Processor 2110 controls the overall operation of system 2100, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 2100 includes interface 2112 coupled to processor 2110, which can represent a higher speed interface or a high throughput interface for system components that needs higher bandwidth connections, such as memory subsystem 2120 or graphics interface components 2140, or accelerators 2142. Interface 2112 represents an interface circuit, which can be a standalone component or integrated onto a processor die. Where present, graphics interface 2140 interfaces to graphics components for providing a visual display to a user of system 2100. In one example, graphics interface 2140 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 2140 generates a display based on data stored in memory 2130 or based on operations executed by processor 2110 or both. In one example, graphics interface 2140 generates a display based on data stored in memory 2130 or based on operations executed by processor 2110 or both.

Accelerators 2142 can be a configurable or fixed function offload engine that can be accessed or used by a processor 2110. For example, an accelerator among accelerators 2142 can provide compression (DC) capability, cryptography services such as public key encryption (PKE), cipher, hash/authentication capabilities, decryption, or other capabilities or services. In some embodiments, in addition or alternatively, an accelerator among accelerators 2142 provides field select controller capabilities as described herein. In some cases, accelerators 2142 can be integrated into a CPU socket (e.g., a connector to a motherboard or circuit board that includes a CPU and provides an electrical interface with the CPU). For example, accelerators 2142 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 2142 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 2120 represents the main memory of system 2100 and provides storage for code to be executed by processor 2110, or data values to be used in executing a routine. Memory subsystem 2120 can include one or more memory devices 2130 such as read-only memory (ROM), flash memory, one or more varieties of random access memory (RAM) such as DRAM, or other memory devices, or a combination of such devices. Memory 2130 stores and hosts, among other things, operating system (OS) 2132 to provide a software platform for execution of instructions in system 2100. Additionally, applications 2134 can execute on the software platform of OS 2132 from memory 2130. Applications 2134 and OS 2132 can be executed within a virtual machine environment or container environment with distinct allocated memory regions. Applications 2134 represent programs that have their own operational logic to perform execution of one or more functions. Processes 2136 represent agents or routines that provide auxiliary functions to OS 2132 or one or more applications 2134 or a combination. OS 2132, applications 2134, and processes 2136 provide software logic to provide functions for system 2100. In one example, memory subsystem 2120 includes memory controller 2122, which is a memory controller to generate and issue commands to memory 2130. It will be understood that memory controller 2122 could be a physical part of processor 2110 or a physical part of interface 2112. For example, memory controller 2122 can be an integrated memory controller, integrated onto a circuit with processor 2110.

While not specifically illustrated, it will be understood that system 2100 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 2100 includes interface 2114, which can be coupled to interface 2112. In one example, interface 2114 represents an interface circuit, which can include standalone components and integrated circuitry. In one example, multiple user interface components or peripheral components, or both, couple to interface 2114. Network interface 2150 provides system 2100 the ability to communicate with remote devices (e.g., servers or other computing devices) over one or more networks. Network interface 2150 can include an Ethernet adapter, wireless interconnection components, cellular network interconnection components, USB (universal serial bus), or other wired or wireless standards-based or proprietary interfaces. Network interface 2150 can transmit data to a device that is in the same data center or rack or a remote device, which can include sending data stored in memory. Network interface 2150 can receive data from a remote device, which can include storing received data into memory. Various embodiments can be used in connection with network interface 2150, processor 2110, and memory subsystem 2120.

In one example, system 2100 includes one or more input/output (I/O) interface(s) 2160. I/O interface 2160 can include one or more interface components through which a user interacts with system 2100 (e.g., audio, alphanumeric, tactile/touch, or other interfacing). Peripheral interface 2170 can include any hardware interface not specifically mentioned above. Peripherals refer generally to devices that connect dependently to system 2100. A dependent connection is one where system 2100 provides the software platform or hardware platform or both on which operation executes, and with which a user interacts.

In one example, system 2100 includes storage subsystem 2180 to store data in a nonvolatile manner. In one example, in certain system implementations, at least certain components of storage 2180 can overlap with components of memory subsystem 2120. Storage subsystem 2180 includes storage device(s) 2184, which can be or include any conventional medium for storing large amounts of data in a nonvolatile manner, such as one or more magnetic, solid state, or optical based disks, or a combination. Storage 2184 holds code or instructions and data 2186 in a persistent state (i.e., the value is retained despite interruption of power to system 2100). Storage 2184 can be generically considered to be a "memory," although memory 2130 is typically the executing or operating memory to provide instructions to processor 2110. Whereas storage 2184 is nonvolatile, memory 2130 can include volatile memory (i.e., the value or state of the data is indeterminate if power is interrupted to system 2100). In one example, storage subsystem 2180 includes controller 2182 to interface with storage 2184. In one example controller 2182 is a physical part of interface 2114 or processor 2110 or can include circuits or logic in both processor 2110 and interface 2114.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 2100. More specifically, power source typically interfaces to one or multiple power supplies in system 2100 to provide power to the components of system 2100. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 2100 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (i.e., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

What is claimed is:

1. An apparatus comprising:
   a memory;
   at least one processor coupled to the memory; and
   an interface coupled to the at least one processor, wherein the at least one processor is to:
      receive a configuration to gather performance data for at least two different serverless computing applications from one or more platforms, wherein the performance data comprises performance data from start to finish of execution of at least one of the at least two different serverless computing applications; and
      collect performance data from the one or more platforms during execution of the at least two different serverless computing applications and store the performance data; and
   the interface is to receive meta-data to identify when execution of a serverless computing application of the at least two different serverless computing applications has finished execution, wherein the meta-data comprises one or more of: a particular event, last line of code, or application termination.

2. The apparatus of claim 1, wherein the interface is to receive one or more of: an identifier of a serverless computing application, resources to be tracked as part of application execution, a list of devices to be tracked as part of execution of the serverless computing application, or a type of monitoring of execution of the serverless computing application.

3. The apparatus of claim 2, wherein the identifier of the serverless computing application comprises a combination of one or more of: an identifier for a tenant, Process Address Space ID (PASID) for an application calling or requesting execution of the serverless computing application, or an identifier of an application.

4. The apparatus of claim 2, wherein the identifier of the serverless computing application is unique for every execution of the serverless computing application.

5. The apparatus of claim 2, wherein the list of devices to be tracked as part of the execution of the serverless computing application comprises at least one device identifier.

6. The apparatus of claim 2, wherein the type of monitoring of application execution comprises one or more of: metrics to track or frequency of metric sampling.

7. The apparatus of claim 6, wherein the metrics to track comprise one or more of: memory bandwidth utilization, memory size usage, memory allocation, core clock frequency speed, core clock cycle utilization, networking bandwidth used, core idle measurement, core execution of user space processes, core waiting for an input/output operation to complete, cache utilization, network interface bandwidth utilization, central processing unit (CPU) cycle utilization, graphics processing unit (GPU) cycle utilization, database transactions/second, collectd telemetry, performance monitoring unit (PMU) counters, performance monitoring counters (PMON), or performance counter monitor.

8. The apparatus of claim 2, wherein the at least one processor is to store the performance data from the one or more platforms into storage after termination of execution of the at least two different serverless computing applications.

9. The apparatus of claim 8, wherein the at least one processor is to provide access to the performance data from the storage to one or more selected requesters.

10. The apparatus of claim 1, comprising resources, the resources comprising one or more of: a single or multi-core processor, a graphics processing unit, a logical execution unit, a single or multi-level cache, functional units usable to independently execute programs or threads, application specific integrated circuits (ASICs), neural network processors (NNPs), programmable control logic, field programmable gate arrays (FPGAs), or programmable logic controllers (PLCs).

11. The apparatus of claim 1, comprising one or more of: a server, data center, rack, or network interface.

12. A computer-implemented method comprising:
   monitoring performance data from start to finish of execution of at least two different serverless functions on resources of one or more platforms and making the performance data available to a requester; and
   providing meta-data to identify when execution of a serverless function of the at least two different serverless functions is complete, wherein the meta-data comprises one or more of: a particular event, last line of code, or application termination.

13. The method of claim 12, wherein the at least two different serverless functions comprise serverless functions that perform different operations, or are a same function but performed at different times or process different data.

14. The method of claim 12, wherein the serverless function of the at least two different serverless functions executes on resources shared with one or more other functions.

15. The method of claim 12, comprising:
   associating an identifier with at least one execution of the serverless function of the at least two different serverless functions and specifying resources to monitor during the at least one execution of the serverless function of the at least two different serverless functions.

16. The method of claim 12, comprising:
   gathering performance data from the one or more platforms during different executions of the serverless function of the at least two different serverless functions and
   making the performance data available for access to selected requesters, wherein the performance data excludes resource usage data during pause or halt of the at least two different serverless functions.

17. At least one non-transitory computer-readable medium comprising instructions stored thereon that if executed by at least one processor, cause the at least one processor to:
   request execution of a short-lived serverless function;
   provide an identifier for at least one execution of the short-lived serverless function;
   specify resources to monitor and metrics to store from the at least one execution of the short-lived serverless function;

access performance data collected from start to finish of execution of at least two different short-lived serverless functions; and receive meta-data to identify when execution of the at least one execution of the short-lived serverless function has finished execution, wherein the meta-data comprises one or more of: a particular event, last line of code, or application termination.

18. The computer-readable medium of claim 17, wherein the resources comprise one or more of: a single or multi-core processor, a graphics processing unit, a logical execution unit, a single or multi-level cache, functional units usable to independently execute programs or threads, application specific integrated circuits (ASICs), neural network processors (NNPs), programmable control logic, field programmable gate arrays (FPGAs), or programmable logic controllers (PLCs).

19. The computer-readable medium of claim 17, wherein the metrics comprise one or more of: memory bandwidth utilization, memory size usage, memory allocation, core clock frequency speed, core clock cycle utilization, networking bandwidth used, core idle measurement, core execution of user space processes, core waiting for an input/output operation to complete, cache utilization, network interface bandwidth utilization, central processing unit (CPU) cycle utilization, graphics processing unit (GPU) cycle utilization, database transactions/second, collectd telemetry, performance monitoring unit (PMU) counters, performance monitoring counters (PMON), or performance counter monitor.

* * * * *